April 19, 1927.
J. R. MEYERS
1,625,130
METHOD OF MAKING, CURING, AND SHIPPING CHEESE IN METAL BANDAGES
Filed Aug. 7, 1922
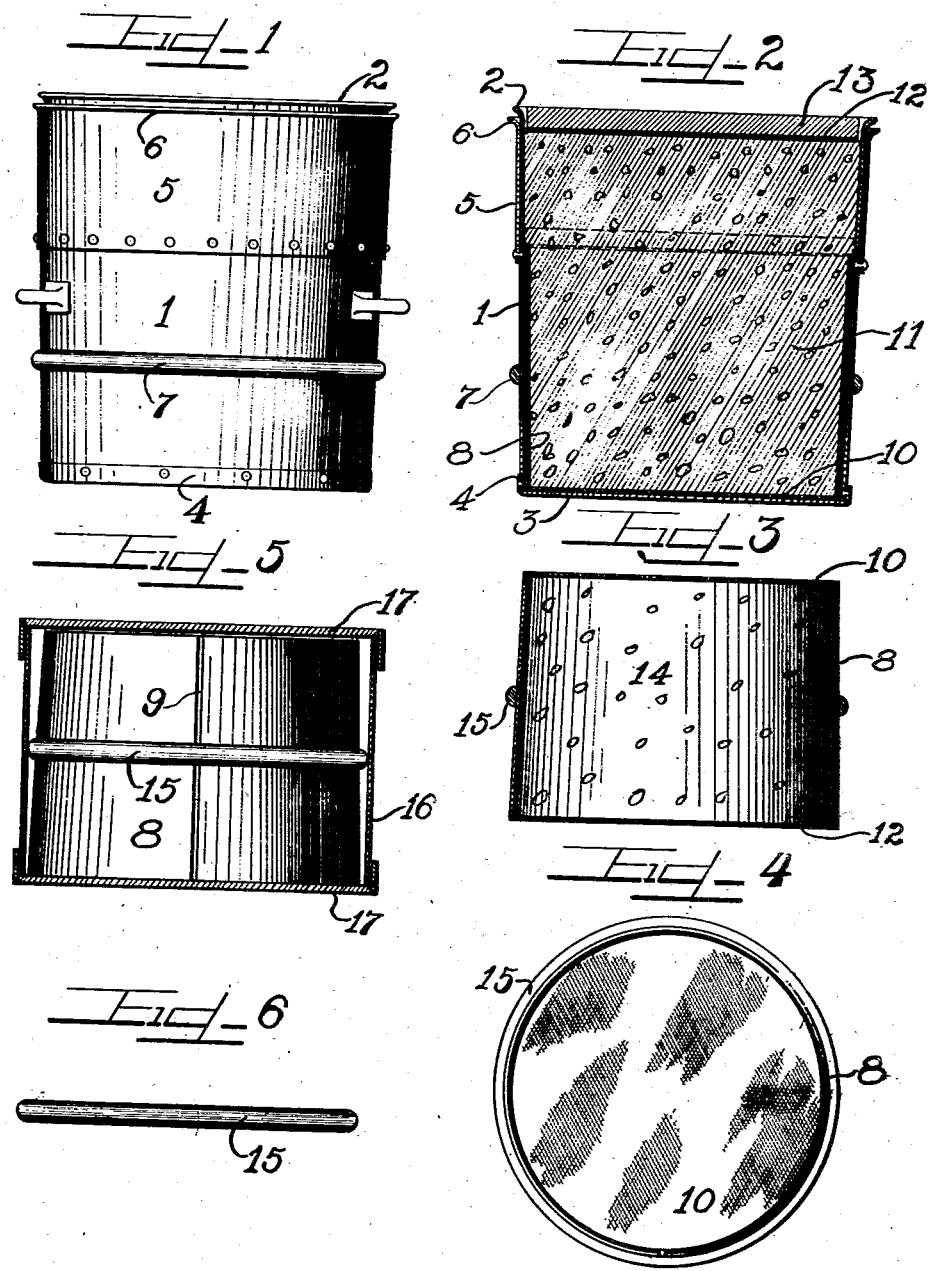

Patented Apr. 19, 1927.

1,625,130

UNITED STATES PATENT OFFICE.

JULIUS R. MEYERS, OF EVANSTON, ILLINOIS, ASSIGNOR TO C. A. STRAUBEL COMPANY, OF GREEN BAY, WISCONSIN, A CORPORATION OF WISCONSIN.

METHOD OF MAKING, CURING, AND SHIPPING CHEESE IN METAL BANDAGES.

Application filed August 7, 1922. Serial No. 580,005.

This invention relates more particularly to an improved method of pressing curds into a split metal bandage contained within gang press hoops to form a green cheese after which the metal bandage containing the cheese is removed, locked, cured and then placed within a crate for shipment.

Cheese has heretofore been generally pressed in cloth bandages but this method has proved unsanitary, wasteful and rather expensive.

It is therefore an important object of this invention to provide a method wherein the cheese is pressed in split bandages, the bandages and cheese being removed from the molds, and locking means being applied to the bandages after which the cheese is cured preparatory to shipment or storage, the locking means being susceptible of tightening as the cheese dries out.

It is an object of this invention to provide a method of compressing curds to form a cheese within a metal bandage in which the cheese is permitted to be cured and shipped.

It is also an object of the invention to provide a method wherein a metal bandage in which the curds are pressed is adapted to be removed from a mold and locked by means of a ring and then put away to cure or be shipped in a crate.

It is also an object of this invention to provide a method wherein the cheese bandage may be reused and wherein the cheese is maintained in sanitary condition.

It is an important object of this invention to provide a method of making, curing and shipping cheese wherein the formation of a rind on the periphery of the cheese is eliminated.

Other and further important objects of this invention will be apparent from the disclosures in the drawings and specification.

The invention (in a preferred form) is illustrated in the drawings and hereinafter more fully described.

On the drawings:

Figure 1 is a front elevation of a gang press hoop.

Figure 2 is a vertical section thereof showing a metal bandage within the hoop.

Figure 3 is an inverted vertical section of the metal bandage and the locking ring with the compressed cheese shown in elevation.

Figure 4 is a top plan view of the bandage and ring.

Figure 5 is a vertical section taken through a usual cheese box containing a cheese holding metal bandage locked by means of a ring.

Figure 6 is an elevation of the bandage locking ring.

As shown on the drawings:

Figure 1 illustrates a curd compressing mold or gang press hoop comprising a tapered cylindrical housing or casing 1, the upper margin of which is flared outwardly to form a flange 2. The lower or bottom end of the casing 1 is closed by means of a bottom plate 3 having an upturned flange 4 which is riveted or otherwise rigidly secured thereto. Riveted to the upper part of casing 1 is a straight cylindrical collar or sleeve 5, the upper end of which is flared outwardly at 6. A reinforcing ring 7 is fastened around the casing 1 between the bottom and the straight sleeve 5. Removably disposed within the tapered casing 1 is a tapered or frustum shaped metal sleeve or bandage 8 split at 9 to permit expansion of the bandage during the filling and compressing process.

The casing 1 is first provided with a bottom lining of cloth 10 after which curds 11 are deposited in said casing. A lining of cloth 12 is placed upon the top of the curds below a follower 13. The curds 11 are compressed by any suitable means into the bandage 8 within the casing 1 to form a green cheese 14, the ends of which are covered by the cloths 10 and 12.

The cheese 14 and bandage 8 are removed from the casing 1 by inverting the same. After the bandage and cheese are removed, the bandage is provided with a metal retaining ring 15 which engages tightly around the bandage and holds the same locked around the cheese 14.

After the bandage 8 is removed from the hoop and locked around the cheese by means of the locking ring 15, it is put away to permit the green cheese 14 to cure. After curing, the locked bandage containing the cured cheese may be deposited within a usual cheese box comprising a cylindrical body or sleeve 16 provided with flanged end covers 17 which may be secured to the body 16 in any suitable manner.

In the manufacture of cheese, curds are first compressed into the bandage 8 within the casing 1 to form a green cheese which is removed from the casing together with the bandage to permit re-use of the gang-press hoops or mold. The split bandage is prevented from springing out of engagement with the cheese by means of the locking ring 15 which is slipped over the frustum shaped bandage to lock the same. The locked bandage containing the green cheese is set away to permit curing of the cheese. In this curing process, the bandages containing the cheese are set on a shelf and turned over daily, sufficient ventilation being afforded by the cloth at the ends of the cheese to permit proper curing thereof. This curing is effected without the formation of a rind inside the metal bandage and a consequent saving of cheese is effected.

After curing, the cheese is shipped in a suitable box or crate such as the usual cheese box. When the crate is received, it may together with the bandage and ring be removed from the cheese and returned to the shipper for re-use.

By keeping the metal bandage locked on a cheese from the time that the curds are compressed until the time that the cheese reaches the point of ultimate distribution, the outer surfaces of the cheese are continually protected. The metal bandage acts to prevent a rind from forming on the circumferential surface of the cheese, while the cloth covers 10 and 12 protect the end surfaces of the cheese.

Furthermore, the slightly tapered configuration of the cheese permits the locking ring 15 to be shifted on the bandage 8 from time to time as the cheese dries out during curing to tighten said bandage, and thus maintain at all times a snug fit between said bandage and cheese.

The possibility of re-use of the metal bandages effects a substantial saving and the superior protection afforded thereby assures the maintenance of the cheese in a sanitary condition during shipment.

I am aware that numerous details of construction may be varied through a wide range without departing from the principles of this invention and I therefore do not purpose limiting the patent granted, otherwise than necessitated by the prior art.

I claim as my invention:

The method of forming and curing a cheese, which consists first in forming and compressing the curds within an adjustable bandage, and then curing the cheese and at the same time contracting the bandage to conform to the shrinkage thereof.

In testimony whereof I have hereunto subscribed by name.

JULIUS R. MEYERS.